(12) United States Patent
Laurent et al.

(10) Patent No.: US 7,021,661 B2
(45) Date of Patent: Apr. 4, 2006

(54) TANK FOR THE HIGH-PRESSURE STORAGE OF A FUEL ON A VEHICLE

(75) Inventors: Daniel Laurent, Marly (CH); David Olsommer, Fribourg (CH); Daniel Walser, Fribourg (CH)

(73) Assignee: Conception et Developpement Michelin S.A., Givisiez (CH)

( * ) Notice: Subject to any disclaimer, the term of this patent is extended or adjusted under 35 U.S.C. 154(b) by 83 days.

(21) Appl. No.: 10/731,999

(22) Filed: Dec. 10, 2003

(65) Prior Publication Data

US 2004/0140662 A1 Jul. 22, 2004

(30) Foreign Application Priority Data

Dec. 18, 2002 (FR) .................................. 02 16260

(51) Int. Cl.
*B62D 21/00* (2006.01)

(52) U.S. Cl. .................. 280/783; 280/831; 220/501; 220/564; 220/4.14

(58) Field of Classification Search .............. 280/831, 280/783, 782, 781; 180/69.5; 220/501 X, 220/564 X, 563, 560.11, 584, 585, 586, 4.14, 220/4.27; 222/6; 206/0.6, 0.7, 535

See application file for complete search history.

(56) References Cited

U.S. PATENT DOCUMENTS

| | | | | | |
|---|---|---|---|---|---|
| 3,608,660 | A | * | 9/1971 | Smith et al. ............... | 180/69.5 |
| 4,523,548 | A | * | 6/1985 | Engel et al. ................ | 123/1 A |
| 5,284,267 | A | * | 2/1994 | Polletta et al. ............. | 220/4.14 |
| 5,370,418 | A | * | 12/1994 | Pugh ......................... | 280/830 |
| 5,673,939 | A | | 10/1997 | Bees et al. .................. | 280/831 |
| 6,047,860 | A | | 4/2000 | Sanders ......................... | 222/3 |
| 6,095,367 | A | | 8/2000 | Blair et al. ................. | 220/581 |
| 6,418,962 | B1 | * | 7/2002 | Wozniak et al. ............ | 137/266 |
| 6,459,231 | B1 | * | 10/2002 | Kagatani .................... | 320/101 |
| 6,527,075 | B1 | * | 3/2003 | Izuchukwu et al. ........ | 180/69.5 |
| 6,676,163 | B1 | * | 1/2004 | Joitescu et al. ............ | 280/834 |
| 2003/0062204 | A1 | * | 4/2003 | Kato et al. ................ | 180/65.1 |

FOREIGN PATENT DOCUMENTS

| | | |
|---|---|---|
| EP | 1092612 | 4/2001 |
| FR | 2684970 | 6/1993 |
| WO | WO 95/02152 | 1/1995 |

* cited by examiner

*Primary Examiner*—Lesley D. Morris
*Assistant Examiner*—Daniel Yeagley
(74) *Attorney, Agent, or Firm*—Fitzpatrick, Cella, Harper & Scinto

(57) ABSTRACT

The structural platform (11) of the vehicle comprises two tanks (T1) and (T2) for the storage on a vehicle of fluids under pressure. Each tank comprises at least one network of cells (2) connected to one another via orifices (3), the orifices being conformed so that the flow of fluid caused by the consumption of fluid necessary for the use of the vehicle exhibits only pressure drops which do not affect the use, and being conformed so that, in the event of rupture of one or more cells (2), the leakage flow causes sufficiently large pressure drops to limit the flow thereof.

16 Claims, 5 Drawing Sheets

TANK FOR THE HIGH-PRESSURE STORAGE OF A FUEL ON A VEHICLE

BACKGROUND OF THE INVENTION

The present invention relates to tanks for storing gas in a road vehicle applicable whatever its type of engine, and in particular applicable for storage of gaseous hydrogen and/or the storage of gaseous oxygen in a fuel cell vehicle.

One of the problems posed by the storage of gas on a vehicle is the danger of explosion in the event of accident to the vehicle, in the event of damage to the tank and/or in the event of an excessively high pressure rise. Discharge valves have already been proposed for liquefied petroleum gas vehicles in order to allow the gas to leak progressively since it is necessary at all costs to avoid the risk of explosion caused by the simple abrupt pressure release of a large quantity of compressed gas. Though this solution is suitable in the event of a pressure rise due to heating, it is of no use in the event of direct damage caused to the tank.

The invention aims to afford a practical and universal solution to the problem of storing a high-pressure fluid on a vehicle.

SUMMARY OF THE INVENTION

According to the invention, the tank for storing a high-pressure fluid on a vehicle forms an integral part of the structural platform of the vehicle and comprises at least one network comprising a large number of cells all in communication by interconnections, the interconnections being conformed so that the flow of liquid caused by the consumption of fluid necessary for the use of the vehicle exhibits only pressure drops not affecting the said use, and being conformed so that, in the event of rupture of one or more cells, the leakage flow causes sufficiently large pressure drops to limit the flow thereof.

The platform constitutes a working bearing structure of the vehicle. In this way, a mechanical purpose is combined harmoniously with a storage purpose having safety which is very appreciably improved compared with the cylinders normally used for storing a fluid under pressure, which makes it possible to construct a sufficiently rigid platform offering sufficient total volume. The interconnections allow the circulation of the gas from one cell to another but at greatly limited flow rate. In this way the circulation of gas necessary for the normal functioning of the vehicle is not affected since the passage flow from one cell to another necessary for the normal functioning of the vehicle is low, which causes only very low pressure drops, perfectly compatible with normal operation. In the example illustrating the invention and described in detail below, each interconnection is formed by an orifice. The orifice is of course of small size in order to fulfil the function disclosed above. However, other solutions could be envisaged, such as a porous material in at least part of the inter-cell wall.

In the event of accident, if one or more of the cells is pierced, only the quantity of gas contained in this cell could escape rapidly to atmosphere, the gas contained in all the other cells certainly being able to escape but at a flow rate greatly reduced by the pressure drops between the various cells. In this way the rapid release of a large quantity of gas is avoided in the case of damage to the tank.

In a fuel-cell vehicle storing the hydrogen necessary for the functioning of the cell, it is possible to apply this scheme both to a hydrogen tank and to an oxygen tank. Naturally this scheme can also be applied to a hydrogen tank only, for instance in the case where the oxygen necessary for the functioning of the cell is supplied by compressing the ambient air.

In a particularly advantageous embodiment, in particular in order to limit the weight of the vehicle, the structural platform forms a floor, various components of the said vehicle being mounted on this floor. This particular arrangement of the invention is of course applicable to all types of vehicle provided that it is necessary to store a fluid at high pressure, such as for example a thermal-engine vehicle functioning with liquefied petroleum gas, even though it has been chosen to illustrate the invention by means of a fuel-cell vehicle, the particular choice of course having no limiting character.

DETAILED DESCRIPTION OF THE INVENTION

Figure 1:
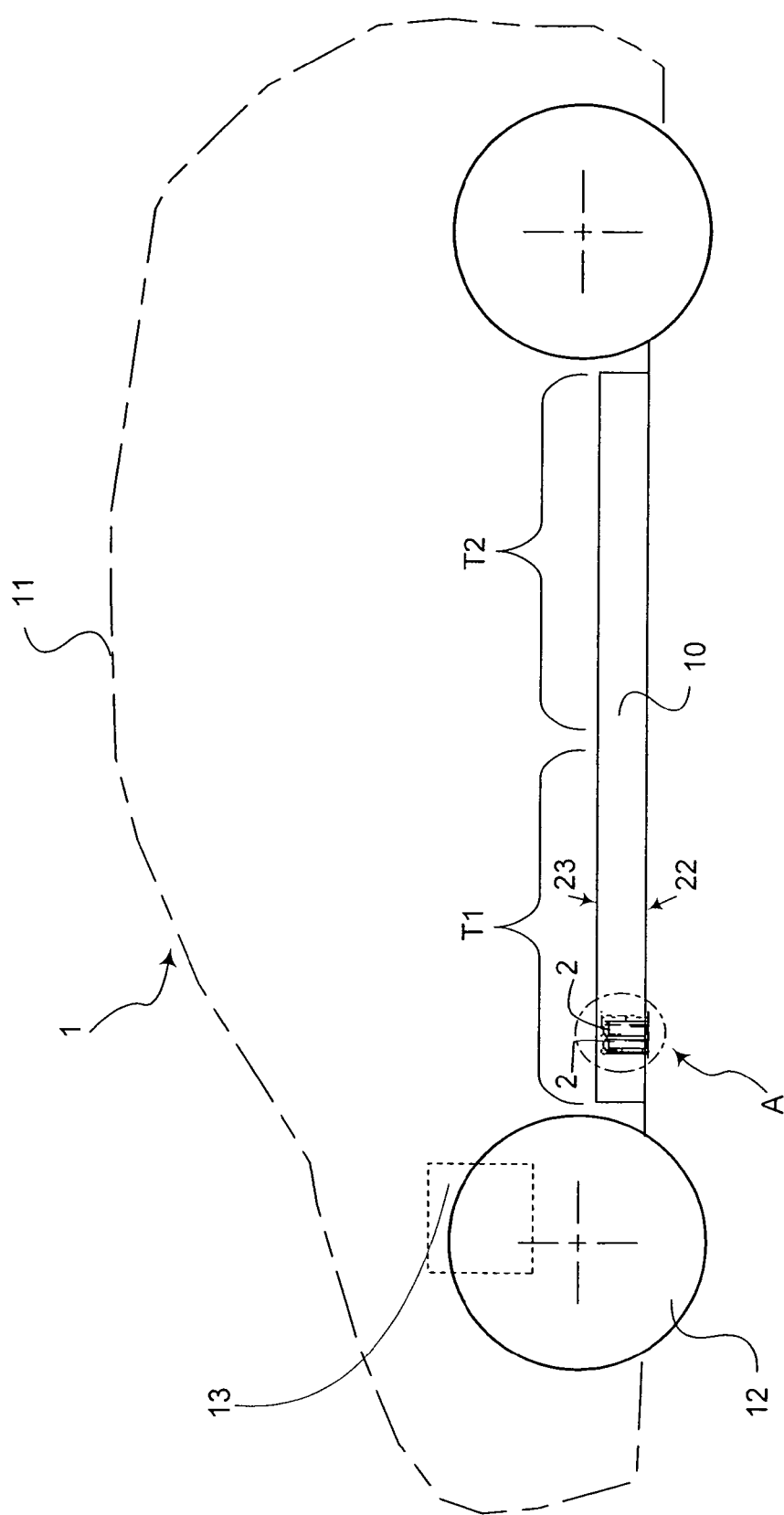
FIG. 1 shows a passenger car.

In FIG. 1 a passenger car 1 can be seen whose bearing platform forms a floor 10. A body 11 can also be seen, made integral with the floor 10 in order to have overall mechanical strength. All the mechanical components as well as the doors of the vehicle and the internal trim are mounted on this bearing structure, including in particular wheels 12 and a fuel cell 13. The floor is designed in order not only to form part of the bearing structure of the vehicle but also to integrate at least one tank for storing a pressurized gas on the vehicle. It may be a case of any fluid stored at high pressure, for example liquefied petroleum gas, compressed natural gas or compressed hydrogen or compressed oxygen.

Figure 2:
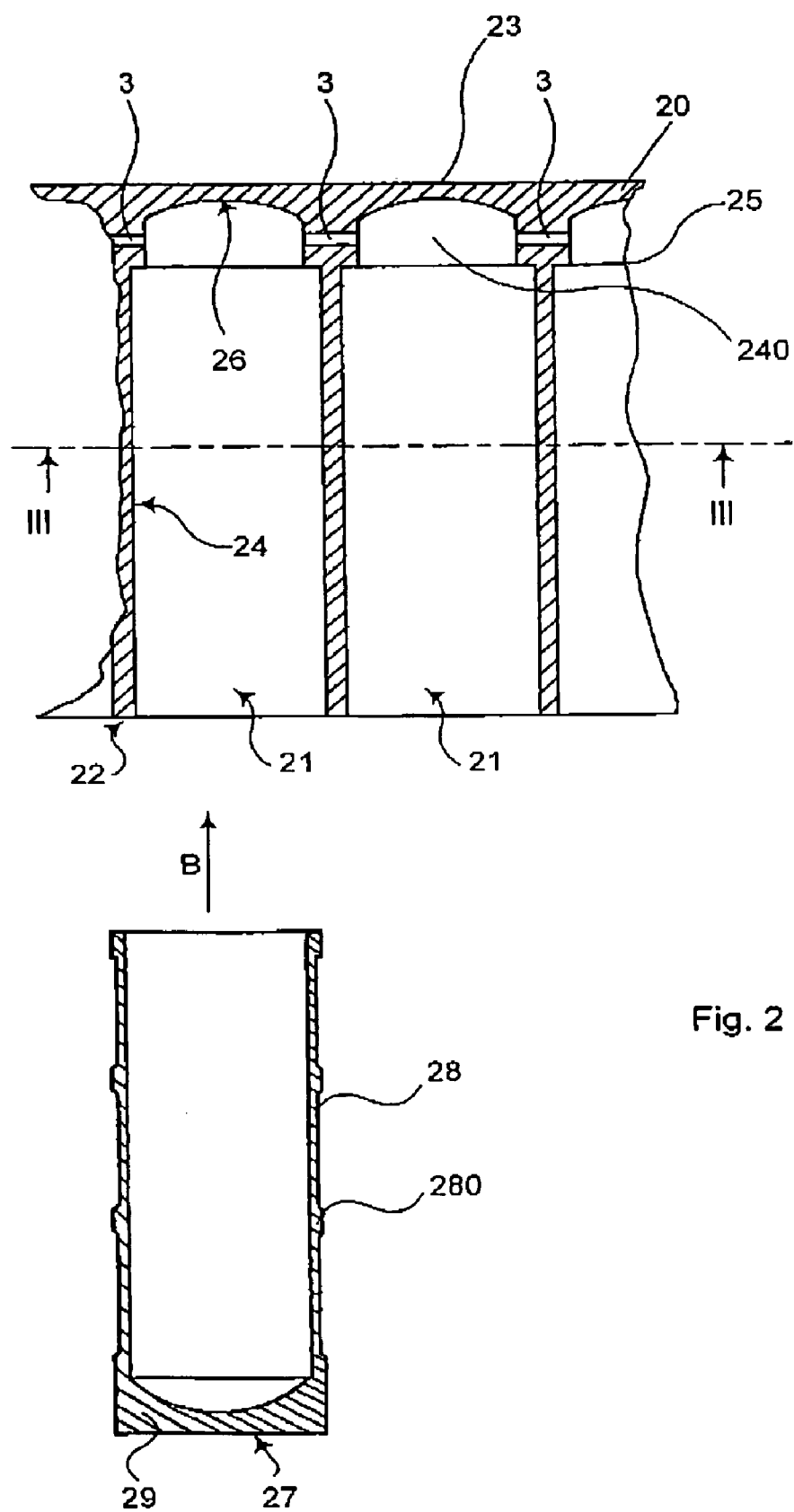
FIG. 2 illustrates a phase of manufacture of the floor of the vehicle shown in FIG. 1.
Figure 3:
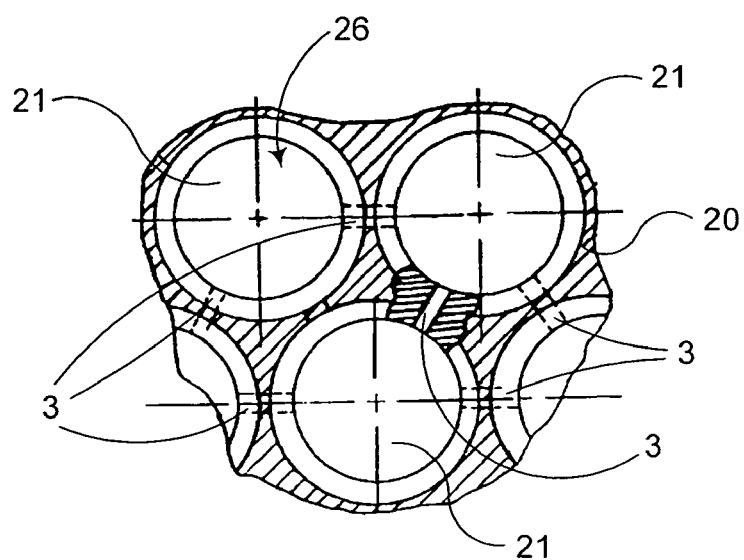
FIG. 3 is a section along III—III in FIG. 2.
Figure 4:
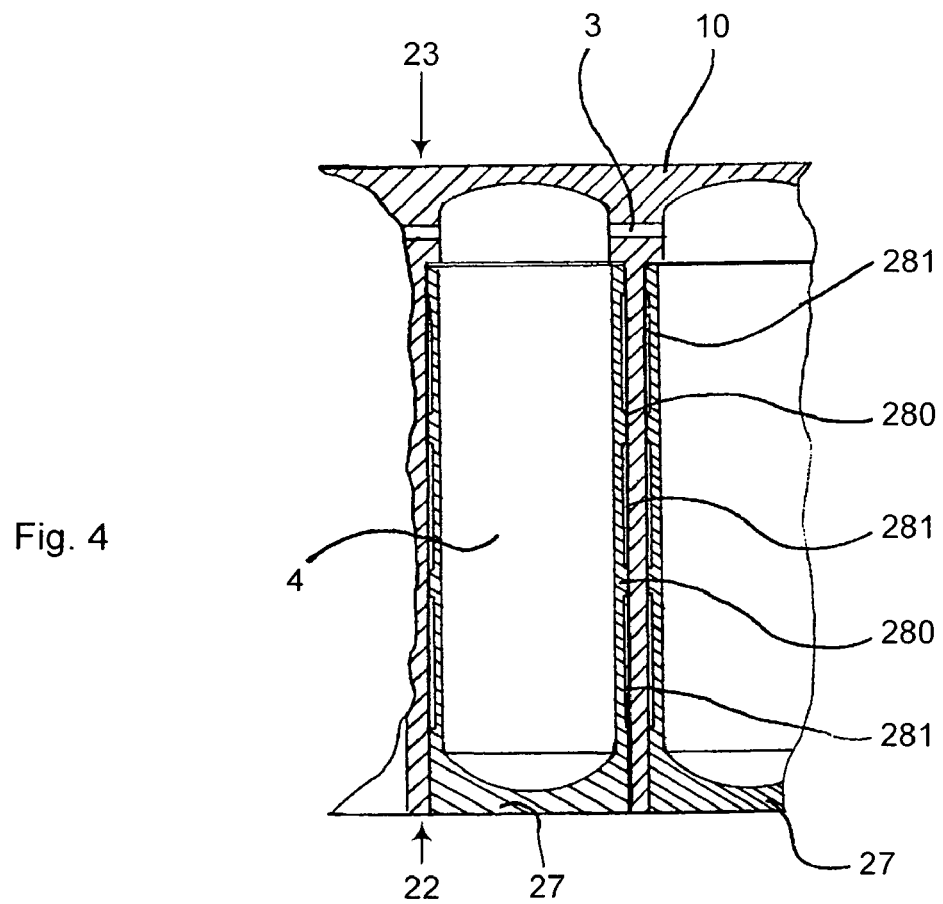
FIG. 4 shows an enlargement of the part pointed to by the arrow A in FIG. 1.

Each tank has a large number of cells 2 of small volume, connected together by orifices 3 which are clearly visible in FIGS. 2 to 4. Preferably, it is envisaged that the tank comprises at least a hundred, for example around a thousand, cells 2 connected together. The industrial manufacture of a tank comprising up to a hundred thousand cells 2 connected together can be envisaged.

In the event of destruction of one or more cells 2, for example following an impact due for example to an accident, the destroyed cell or cells immediately go to atmospheric pressure. However, by virtue of the strength of the walls of the cells adjacent to the destroyed cell or cells, the destruction of one or more cells causes no rupture in cascade. The fluid remains momentarily contained, at slowly decreasing pressure, in the adjacent intact cells. The leakage flow of the intact cells to the destroyed cell or cells is greatly limited by the presence of the orifices. It is known in particular that the speed of flow of a gas through an orifice is limited to the speed of sound, from a certain ratio of pressures prevailing on both sides of the orifice, and that the speed does not increase even if the pressure ratio increases.

An important sizing characteristic should be emphasized here: all the walls of each cell 2 must be capable of withstanding the storage pressure of the fluid by themselves alone. This does not exclude, in the event of damage occurring within the network of cells, the walls of the adjacent cells deforming under the effect of internal pressure. An exceeding of the elastic limit is acceptable, but naturally not an exceeding of the rupture limit.

Naturally, the tank emptying completely cannot be avoided. However, for a mass of hydrogen stored of around a few kilograms, in the event of destruction of one or more cells, the time necessary for emptying the tank can be extended up to several minutes. The effect of explosion is thus avoided.

Even if this design results in increasing the total volume necessary for storing a given mass of gas at a given pressure, this does not proportionally increase the weight of the tank and this truly makes it possible to make the tank part of the working structure of the vehicle, which is advantageous for the overall weight of the vehicle.

The floor 10 integrates a tank T1 with communicating cells 2, for storing gaseous hydrogen. The vehicle illustrating the invention is a fuel-cell vehicle storing not only hydrogen which it needs but also oxygen in the form of compressed gas. In this case it may be preferred to store the gaseous oxygen in a tank independent of the vehicle platform, for example a tank formed for one or more cylinders of conventional technology.

It is also possible for the floor 10 of the vehicle to integrate several tanks, for example two independent tanks for storing two different gases, each of the tanks having the characteristics of the invention, as will be explained below. It is if necessary possible to envisage storing both hydrogen and oxygen through a judicious choice of material for producing the floor forming a platform (a material which does not propagate flame) and preferably by means of other precautions which will be explained.

Figure 6:
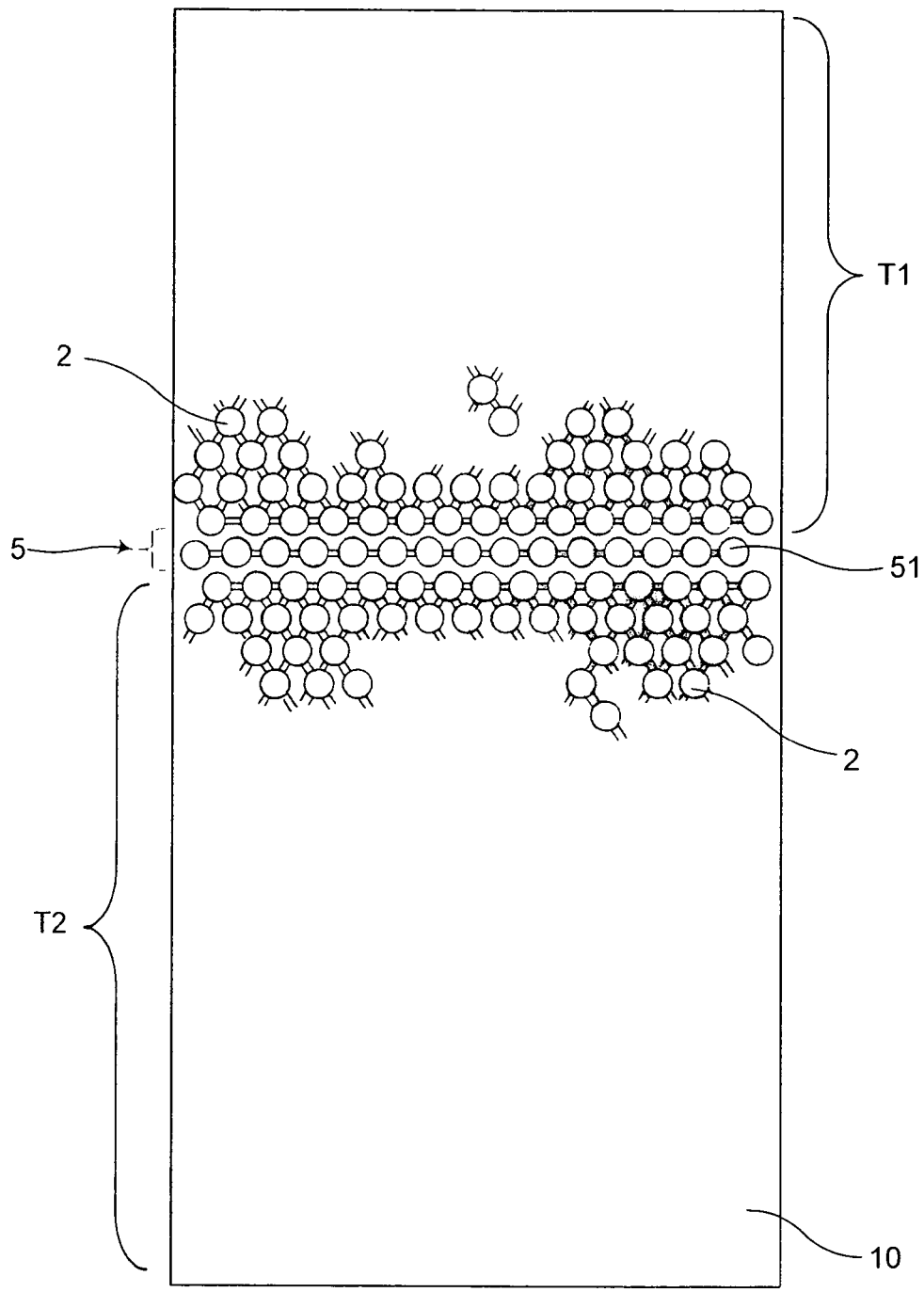
FIG. 6 is a plan view of another variant embodiment of the floor according to the invention.

In FIG. 6, a first area of the floor 10 can be seen, forming the tank T1 able to store hydrogen. A second area of the floor 10 forms a second tank T2 with communicating cells 2, naturally not communicating with the cells 2 of the tank T1, the tank T2 being able to store oxygen.

Preferably, between the tank T1 and the tank T2, an area is left with no cells of significant width, or provided with dead cells which do not communicate or are filled with neutral gas, for example comparable with the total thickness of the base, in order to limit the risk of formation of a mixture of hydrogen and oxygen, this mixture being explosive. In a variant of the schematic representation of FIG. 1, one side of the floor can be reserved over its entire length for a tank, for example for oxygen, and the other side of the floor reserved over its entire length for a tank, for example for hydrogen, the two tanks being of course able to be separated by a separation area 5 with no cells, the said separation area being of sufficiently great width, or provided with cells 51 not communicating with the cells in the adjacent tanks, the said cells being put in communication with the atmosphere or being filled with neutral gas, possibly under pressure, eventually at pressure greater than the pressure of the fluids in the tanks T1 and T2. Thus the risks of formation of a mixture of oxygen and hydrogen in the event of side impact are considerably limited. Preferably, the floor does not exceed the length included between the axles, and is protected at the front and rear of the vehicle and preferably also laterally by areas absorbing impact by deformation.

In order to promote the strength of the cells, it is advantageous for their shape to be close to the shape normally adopted for pressurized gas storage cylinders. For example, each cell advantageously comprises a central part whose wall is substantially cylindrical and two end parts forming a wall fitting within a sphere.

A description is now given of how it is possible to produce such a tank, with FIGS. 3 and 4 supporting this description. The floor is produced from a block (preferably made from aluminum in the case of a platform integrating solely a hydrogen tank) of suitable shape and volume, corresponding to the final characteristics of the floor. The block has a flattened shape having a first face 22 and an opposite face 23 substantially parallel to the first face. This block is intended to form, for example by machining, a base 20 which has as many recesses 21 as there are cells. The recesses 21 all extend from a first face 22 to the opposite face 23. They all open out at the first face 22 and do not open out at the opposite face 23. Each recess 21 comprises a first part 24 substantially cylindrical in shape and extends between the first face 22 and an intermediate level 25 situated between the first face 22 and the opposite face 23. Each recess 21 comprises a second part 240 extending the first and comprising a wall 26 forming a dome, whose detail shape is well known to specialists in pressurized receptacles. The orifices 3 are situated in this second part 26.

In FIG. 2, a cover 27 can be seen. As many covers 27 are used as there are recesses. Each cover comprises a trunk 28 whose wall is substantially cylindrical. On the external surface of the trunk 28, ribs 280 can be seen. The outside diameter of the trunk 28 is smaller than or equal to the inside diameter of the first part 24 of the recesses 21. Each cover 27 comprises a bottom 29 whose internal wall forms a cap. All the covers 27 are introduced into the recesses, gluing the surfaces to be bonded. The ribs 280 prevent all the adhesive being scraped off and provide the accumulation of adhesive in the small volumes 281 (see FIG. 4). This makes it possible to close the recesses 21 in a sealed fashion, thus creating the cells 2. The ribs 280 shown above on the cover could, instead of this, be produced on the wall of the first part 24 of the recesses 21. In the latter case, provision can be made for fixing the covers by deformation of its walls under the effect of a high internal pressure.

In FIG. 3, it can be seen that each cell 2 is connected to all the adjacent cells. It should be emphasized that this is not at all essential, all the combinations of connections being able to be envisaged between what is shown in the figures and only the connections necessary for connecting the cells in series. In FIG. 4, a partial section through the floor 10 can be seen, showing in detail the cells 2 interconnected by the orifices 3.

Machining has been mentioned for producing the base 20. However, this or at least a blank thereof could be produced by casting, in particular lost-wax casting.

Figure 5:
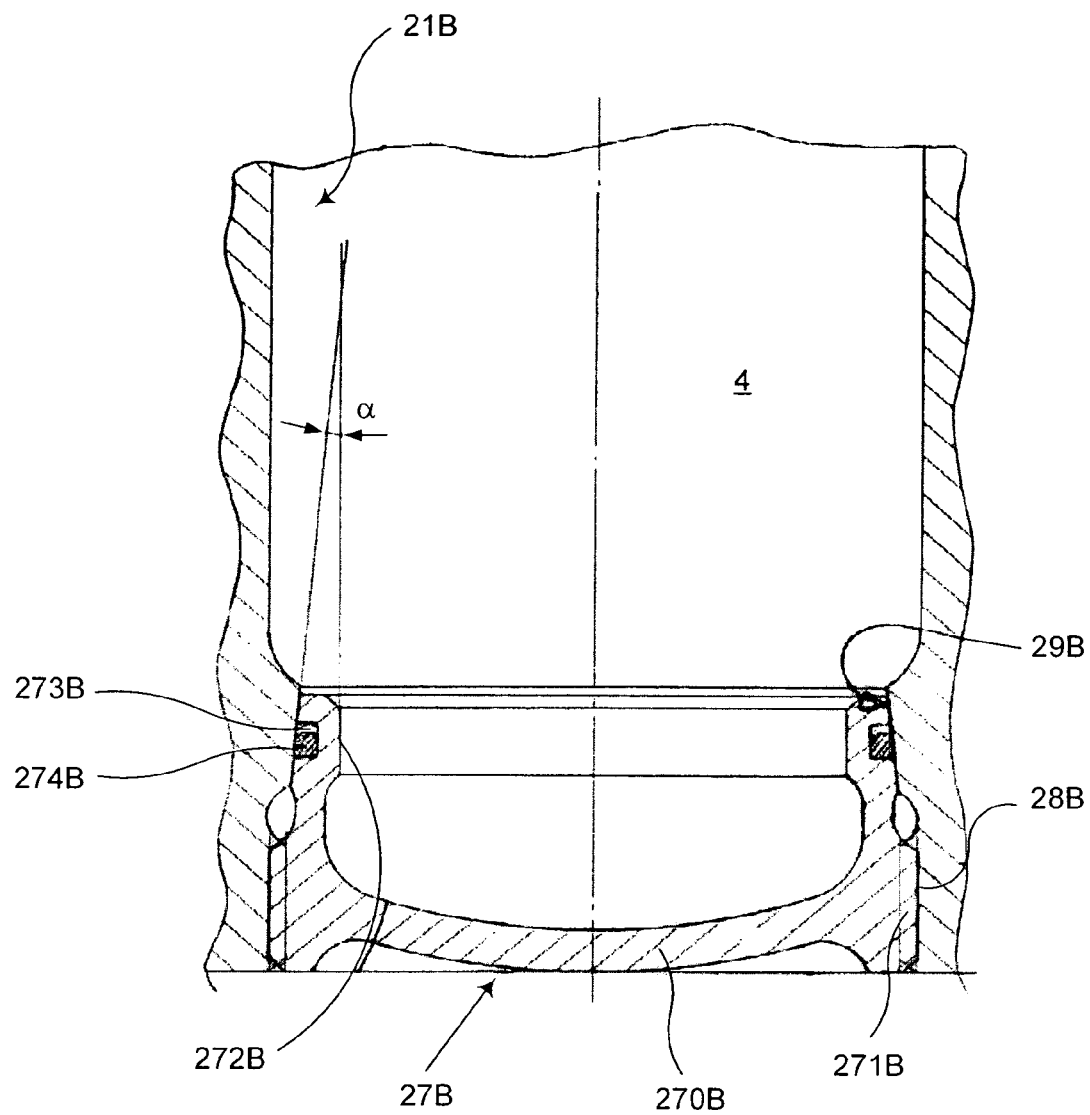
FIG. 5 shows a. variant embodiment.

In a variant, as shown in FIG. 5, it is possible to use covers 27B screwed into recesses 21B. In this case, the walls of the first part of the recesses 21B comprise a thread 28B. Beyond the thread, the walls comprise a frustoconical surface 29B of angle α. The cover 27B comprises a head 270B, a threaded rim 271B, and a skirt 272B whose external surface is also frustoconical at the same angle α. The skirt 272B comprises a groove 273B receiving a seal 274B. Between the head 270B and the skirt 272B, the wall of the cover 27B is thinned, so that the skirt is all the more firmly pressed against the surface of the frustoconical surface 29B, the higher the pressure prevailing inside the cell 4. The problem of the extrusion of the seal is thus avoided. It will also be possible to use an adhesive in the thread in order to fix the base and covers definitively and in a sealed manner.

Finally, of course, it may be remarked that the speed of filling of a tank according to the invention will be comparable to the speed at which this empties during an accident.

The choice of connections shown in the figures contributes to a short filling time, all other things being equal. If it is wished to fill such a tank more rapidly without also reducing the emptying time, it is possible to provide a device supplying in parallel several non-adjacent cells, through specific orifices, the device being provided with valves which provide a seal after filling.

Amongst the variant embodiments, let it also be indicated that the cells could not be interconnected with all the adjacent cells. The tank could comprise a network of cells connected only in series, or several networks of cells connected in series, the networks being connected in parallel.

What is claimed is:

1. Structural platform for a motor vehicle, the structural platform comprising a tank for the storage on the vehicle of a fluid under pressure, the tank comprising at least one network of containers integrally formed in the structural platform and connected together via interconnections, the interconnections being conformed so that the flow of fluid caused by the consumption of fluid necessary for the use of the vehicle exhibits only pressure drops not affecting the use, and being conformed so that, in the event of rupture of one or more containers, the leakage flow causes sufficiently high pressure drops to limit the flow rate thereof, wherein the structural platform forms a load-bearing component of the vehicle, and wherein each of inner ones of the containers is adjacent to at least six other containers.

2. Structural platform for a motor vehicle, the structural platform comprising a tank for the storage on the vehicle of a fluid under pressure, the tank comprising at least one network of containers connected together via interconnections, the interconnections being conformed so that the flow of fluid caused by the consumption of fluid necessary for the use of the vehicle exhibits only pressure drops not affecting the use, and being conformed so that, in the event of rupture of one or more containers, the leakage flow causes sufficiently high pressure drops to limit the flow rate thereof, wherein at least one network of at least a hundred and no more than a hundred thousand containers are connected together via interconnections.

3. Structural platform according to claim 2, each interconnection being formed by an orifice.

4. Structural platform according to claim 2, in which each container comprises a central part whose wall is substantially cylindrical and a cap at each end.

5. Structural platform according to claim 2, comprising several networks of containers connected in series, the networks being connected in parallel.

6. Vehicle equipped with a structural platform according to claim 2, the structural platform at least partially a forming a floor of the vehicle on which various components of the vehicle are mounted.

7. Vehicle according to claim 6, comprising a fuel container, the tank integrated in the structural platform providing the storage of gaseous hydrogen.

8. Vehicle according to claim 7, comprising a fuel container and two tanks integrated in the structural platform, one of the tanks providing the storage of gaseous hydrogen and the other tanks providing the storage of gaseous oxygen.

9. Structural platform according to claim 2, wherein the containers are arranged in a plane and have central axes perpendicular to the plane.

10. Structural platform for a motor vehicle, the structural platform comprising a tank for the storage on the vehicle of a fluid under pressure, the tank comprising at least one network of containers integrally formed in the structural platform and connected together via interconnections, the interconnections being conformed so that the flow of fluid caused by the consumption of fluid necessary for the use of the vehicle exhibits only pressure drops not affecting the use, and being conformed so that, in the event of rupture of one or more containers, the leakage flow causes sufficiently high pressure drops to limit the flow rate thereof, wherein the structural platform forms a load-bearing component of the vehicle, wherein the structural platform integrates a second independent tank for storing another different fluid, and the second tank comprises at least one network of containers connected together via interconnections, the interconnections being conformed so that the flow of fluid caused by the consumption of fluid necessary for the use of the vehicle exhibits only pressure drops not affecting the use, and being conformed so that, in the event of rupture of one or more containers, the leakage flow causes sufficiently high pressure drops to limit the flow rate thereof.

11. Structural platform according to claim 1, in which, between the tank and the second tank, a separation area with no containers is left.

12. Structural platform according to claim 1, in which, between the tank and the second tank, a separation area is left, provided with containers which do not communicate with the containers of the adjacent tanks.

13. Structural platform for a motor vehicle, forming a tank for the storage on the vehicle of a fluid under pressure, the tank comprising at least one network of containers connected together via interconnections, the interconnections being conformed so that the flow of fluid caused by the consumption of fluid necessary for the use of the vehicle exhibits only pressure drops not affecting the use, and being conformed so that, in the event of rupture of one or more containers, the leakage flow causes sufficiently high pressure drops to limit the flow rate thereof, the structural platform comprising a base which comprises as many recesses as there are containers, the base having a flattened shape having a first face and an opposite face substantially parallel to the first face, the recesses all extending from the first face to the opposite face and all opening out at the first face and not opening out at the opposite face, each recess being closed by a cover sealingly fixed so as to form a container, orifices being provided in the base in order to put the recesses in communication.

14. Structural platform according to claim 13, in which each recess comprises a first part with a substantially cylindrical shape, extending between the first face and an intermediate level situated between the first face and the opposite face, each recess comprising a second part extending the first part and comprising a wall forming a cap.

15. Structural platform according to claim 13, in which each cover comprises a trunk whose wall is substantially cylindrical and with an outside diameter smaller than or equal to the inside diameter of the first part of each recess, each cover comprising a bottom, all the covers being inserted and adhesively bonded in the recesses.

16. Structural platform according to claim 13, in which each cover is screwed into recesses, with the interposing of a seal.

* * * * *

UNITED STATES PATENT AND TRADEMARK OFFICE
CERTIFICATE OF CORRECTION

| | |
|---|---|
| PATENT NO. | : 7,021,661 B2 |
| APPLICATION NO. | : 10/731999 |
| DATED | : April 4, 2006 |
| INVENTOR(S) | : Daniel Laurent et al. |

Page 1 of 1

It is certified that error appears in the above-identified patent and that said Letters Patent is hereby corrected as shown below:

COLUMN 2

Line 24, "a." should read --a--.

COLUMN 5

Line 50, "a" should be deleted.

COLUMN 6

Line 21, "claim 1," should read --claim 10,--.
Line 24, "claim 1," should read --claim 10,--.

Signed and Sealed this

Twenty-seventh Day of November, 2007

JON W. DUDAS
*Director of the United States Patent and Trademark Office*